(12) United States Patent
Okada et al.

(10) Patent No.: US 6,350,845 B1
(45) Date of Patent: Feb. 26, 2002

(54) POLYIMIDE COMPOSITIONS AND NOVEL ACID DIANHYDRIDES TO BE USED THEREIN

(75) Inventors: Koji Okada; Shoji Hara; Hitoshi Nojiri, all of Shiga (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/604,116

(22) Filed: Jun. 26, 2000

(30) Foreign Application Priority Data

Jun. 28, 1999 (JP) .......................................... 11-182601

(51) Int. Cl.$^7$ ........................ C08G 73/10; C08G 69/26; C08G 69/28
(52) U.S. Cl. ........................ 528/170; 528/125; 528/126; 528/128; 528/171; 528/172; 528/173; 528/174; 528/175; 528/179; 528/183; 528/185; 528/188; 528/220; 528/229; 528/350; 528/353
(58) Field of Search ................................ 528/125, 126, 528/128, 171, 170, 172, 173, 174, 175, 179, 183, 185, 188, 220, 229, 350, 353

(56) References Cited

U.S. PATENT DOCUMENTS

| | | | | |
|---|---|---|---|---|
| 5,310,863 A | * | 5/1994 | Sachdev ...................... | 528/170 |
| 5,952,448 A | * | 9/1999 | Lee et al. .................... | 528/353 |
| 6,031,068 A | * | 2/2000 | Okada ........................ | 528/353 |
| 6,040,418 A | * | 3/2000 | Yamamoto et al. ......... | 528/125 |

FOREIGN PATENT DOCUMENTS

| | | |
|---|---|---|
| JP | A-S57-143329 | 9/1982 |
| JP | A-S61-57620 | 3/1986 |
| JP | A-H2-225522 | 9/1990 |
| JP | A-H4-7333 | 1/1992 |
| JP | B-4-100020 | 4/1992 |

* cited by examiner

*Primary Examiner*—P. Hampton-Hightower
(74) *Attorney, Agent, or Firm*—Armstrong, Westerman, Hattori, McLeland & Naughton, LLP

(57) ABSTRACT

Novel polyimides substituted by a substituent having an alkyl or fluoroalkyl group and having reduced water absorption; a process for producing these novel polyimides; and novel acid dianhydrides to be used in the production thereof.

A polyimide containing a structure represented by the following general formula (I):

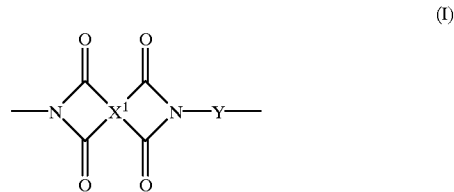

(I)

wherein $X^1$ represents a tetravalent organic group having a substituent $—R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group); and Y represents a divalent organic group.

15 Claims, No Drawings

POLYIMIDE COMPOSITIONS AND NOVEL ACID DIANHYDRIDES TO BE USED THEREIN

FIELD OF THE INVENTION

This invention relates to novel polyimides, novel polyamic acids which are intermediates thereof, a process for producing the same and novel acid dianhydrides to be used in the production of these novel polyimides. More particularly, it relates to novel polyimides obtained by introducing a monomer unit derived from acid dianhydrides substituted by a substituent having an alkyl or fluoroalkyl group into the molecule and these acid dianhydrides.

BACKGROUND OF THE INVENTION

Because of being excellent in heat resistance among various organic polymers, polyimides have been widely used in the fields of, for example, cosmology, aeronautics, electronic communication and office automation instruments. In recent years, there have been particularly required polyimides which have not only a high heat resistance but also various functions appropriate for uses.

In general, a polyimide has a relatively high water absorption due to the large polarization between C=O and N in its imide ring. To improve the existing polyimides, it is therefore one of the problems to be solved to reduce the water absorption.

As one of methods for reducing the water absorption of polyimides, JP-A-57-143329, JP-A-61-57620, JP-A-2-225522, JP-A-4-7333 and JP-A-4-100020 disclose a method of introducing alkyl and fluoroalkyl groups (the term "JP-A" as used herein means an "unexamined published Japanese patent application"). In this method, diamines having an alkyl or fluoroalkyl group is used to thereby introduce these substituents into polyimides. However, there has been reported so far no polyimide obtained by introducing an alkyl or fluoroalkyl group into an acid dianhydride and then reacting it with a diamine. This is seemingly because there is known no acid dianhydride having an alkyl or fluoroalkyl group per se.

SUMMARY OF THE INVENTION

As the results of intensive studies, the present inventors have found out acid dianhydrides carrying a substituent having alkyl or fluoroalkyl group introduced thereinto and a process for producing novel polyimides by using the same. The invention has been completed based on these findings.

The polyimide according to the invention is a polyimide containing a structure represented by the following general formula (I):

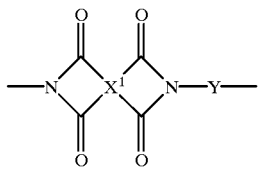

(I)

wherein $X^1$ represents a tetravalent organic group having a substituent $—R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group); and Y represents a divalent organic group.

DETAILED DESCRIPTION OF THE INVENTION

The term "organic group" as used herein means a group which is a part of an organic compound and has linkage site(s) (the number of these linkage sites is expressed as valency). Aromatic groups and aliphatic groups may fall within the category of the organic group. It is preferable that the organic group has at least a part of its linkage sites on aromatic carbonatom(s). Although the organic group is not particularly restricted in bulkiness, it typically carries from 15 to 74, preferably from 19 to 59 and still preferably form 26 to 46, carbon atoms.

The term "linkage group" as used herein means a divalent functional group which consists of, if necessary, hydrogen atom(s), carbon atom(s) and at least one heteroatom selected from among, for example, oxygen, nitrogen and sulfur atoms and has at least one of the linkage sites on the hetero atom.

In one embodiment of the invention, A is an ester bond, an amide bond or a sulfonamide bond. An ester bond is a group formed by dehydrating condensation of an oxo acid with an alcohol. For example, an ester bond of a carboxylic acid ester may be represented by —COO— or —OCO—. The same applies to other oxo acid esters. An amide bond may be represented by —NH—CO— or —CO—NH—. A sulfonamide bond may be represented by —NH—SO$_2$— or —SO$_2$—NH—.

In one embodiment of the invention, the polyimide is a copolymer having a structure represented by the following general formula (II)

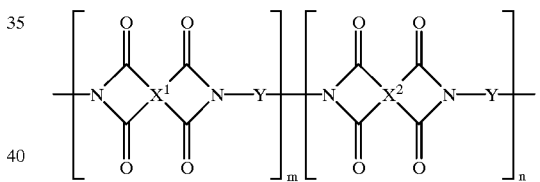

(II)

wherein $X^1$ represents a tetravalent organic group having a substituent $—R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group);

$X^2$ is a tetravalent organic group different from $X^1$;

Y represents a divalent organic group;

m is an integer of 1 or more;

n is an integer of 0 or more; and m/m+n is 0.01 or more; and having an average molecular weight of from 5,000 to 1,000,000.

m and n represent respectively the numbers of imide units contained in the copolymer molecule, while m/m+n represents the ratio of the imide unit having $X^1$. m preferably ranges from 1 to 100, n preferably ranges 0 to 99 and m+n preferably ranges from 1 to 100. m/m+n preferably ranges from 0.01 to 1, still preferably form 0.1 to 1 and still preferably from 0.2 to 1.

$X^1$, $X^2$ and Y may each occur in plural types in a polymer molecule.

The term "average molecular weight" as used herein means weight-average molecular weight measured by gel permeation chromatography (GPC). It preferably ranges from 3,000 to 1,000,000, still preferably from 10,000 to 500,000 and still preferably from 20,000 to 300,000.

In one embodiment of the invention, $X^1$ is represented by the following general formula:

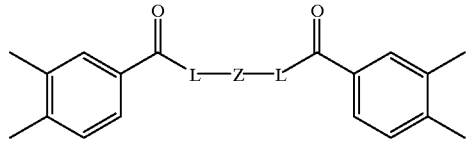

wherein Z represents a divalent aromatic or aliphatic group having a substituent —$R^1AR^2$ (wherein A represents a divalent linkage group; $R^1$ represents a single bond or a $C_{1-3}$ alkylene group; and $R^2$ represents a $C_{1-2}$ alkyl group or a fluoroalkyl group); and L is —O— or —NH—.

The term "aromatic group" means a group containing at least one aromatic ring (for example, aryl, heteroaryl, arylalkyl). It carries typically from 15 to 74, preferably form 19 to 59 and still preferably from 26 to 46, carbon atoms in total.

The term "aliphatic group" means a group having an aliphatic moiety but being free from aromatic rings. It carries typically from 1 to 60, preferably form 5 to 45 and still preferably from 12 to 32, carbon atoms.

In one embodiment of the invention, Z is represented by one of the following general formulae:

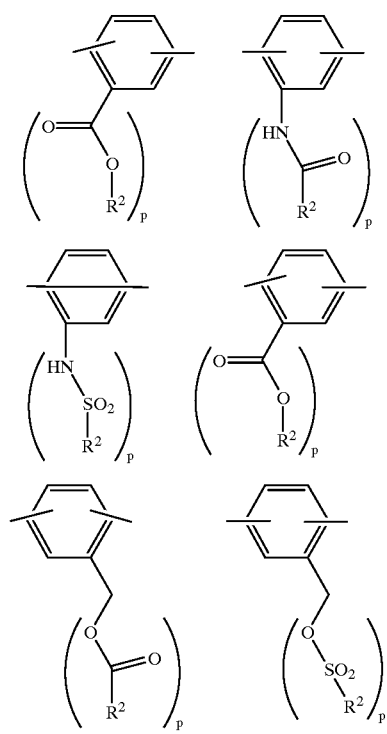

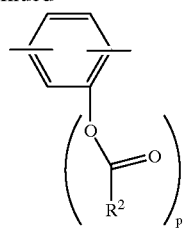

wherein $R^2$ represents a $C_{1-25}$ alkyl group or a fluoroalkyl group; and p is from 1 to 4.

The above general formulae representing Z all indicate that Z can link at any two sites on the aromatic ring. It is preferable that p is from 1 to 3.

In one embodiment of the invention, Z is —$CH_2CH(COOR^2)CH(COOR^2)CH_2$—, —$CH_2CH(OCOR^2)CH(OCOR^2)CH_2$—, —$CH_2C(CH_2COOR^2)_2$—, —$CH_2C(CH_2OCOR^2)_2CH_2$—, —$CH(CH_2COOR^2)CH(CH_2COOR^2)$—, —$CH(CH_2COOR^2)CH(CH_2OCOR^2)$— or —$CH_2CH(CH_2COOR^2)$—, wherein $R^2$ represents a $C_{1-25}$ alkyl group or a fluoroalkyl group.

The polyimide composition of the invention is a composition containing one of the polyimides as described above. This composition may contain an arbitrary liquid or powder as a diluting medium wherein the polyimide can be dissolved or uniformly dispersed.

The polyamic acid according to the invention contains a structure represented by the following general formula (III):

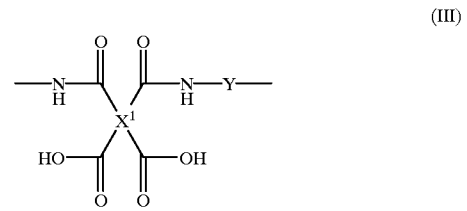

(III)

wherein $X^1$ represents a tetravalent organic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group); and Y represents a divalent organic group.

In one embodiment of the invention, A is an ester bond, an amide bond or a sulfonamide bond.

In one embodiment of the invention, the polyamic acid is a copolymer having a structure represented by the following general formula (IV) or a structure represented by the following general formula (IV) wherein some of the amic acid moiety has been dehydrated and condensed:

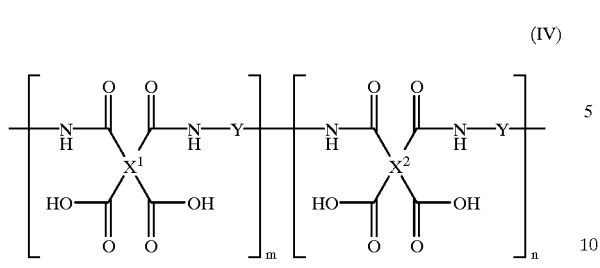

(IV)

wherein $X^1$ represents a tetravalent organic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group);

$X^2$ is a tetravalent organic group different from $X^1$;

y represents a divalent organic group;

m is an integer of 1 or more;

n is an integer of 0 or more; and m/m+n is 0.01 or more; and having an average molecular weight of from 5,000 to 1,000,000.

In one embodiment of the invention, $X^1$ is represented by the following general formula:

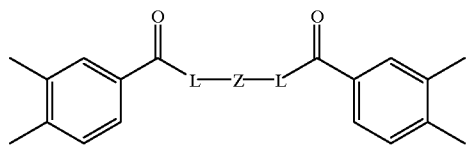

wherein Z represents a divalent aromatic or aliphatic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group) and L is —O— or —NH—.

In one embodiment of the invention, Z is represented by one of the following general formulae:

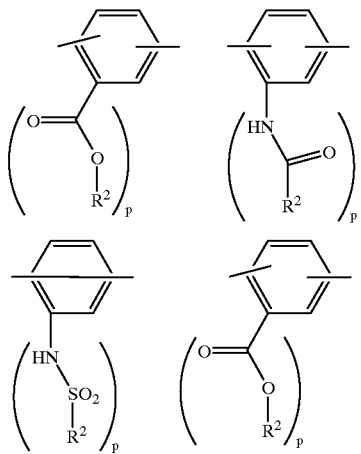

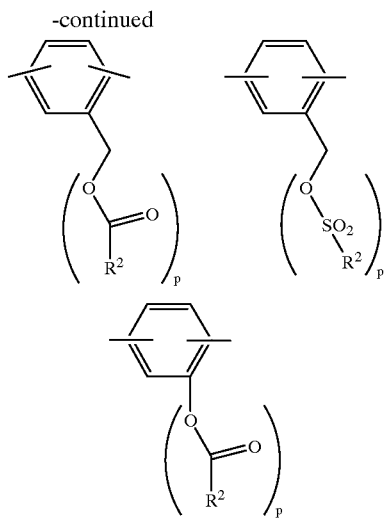

wherein $R^2$ represents a $C_{1-25}$ alkyl group or a fluoroalkyl group; and p is from 1 to 4.

In one embodiment of the invention, Z is —$CH_2CH(COOR^2)CH(COOR^2)CH_2$—, —$CH_2CH(OCOR^2)CH(OCOR^2)CH_2$—, —$CH_2C(CH_2COOR^2)_2CH_2$—, —$CH_2C(CH_2OCOR^2)_2CH_2$—, —$CH(CH_2COOR^2)CH(CH_2COOR^2)$—, —$CH(CH_2COOR^2)CH(CH_2OCOR^2)$— or —$CH_2CH(CH_2COOR^2)$—, wherein $R^2$ represents a $C_{1-25}$ alkyl group or a fluoroalkyl group.

The acid dianhydride according to the invention has a structure represented by the following general formula (V):

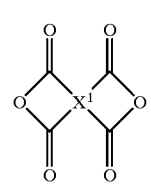

(V)

wherein $X^1$ represents a tetravalent organic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group).

In one embodiment of the invention, A is an ester bond, an amide bond or a sulfonamide bond.

In one embodiment of the invention, $X^1$ is represented by the following general formula:

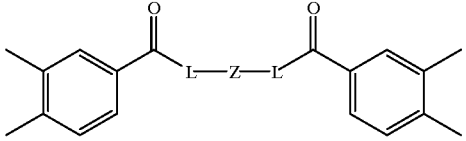

wherein Z represents a divalent aromatic or aliphatic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group); and L is —O— or —NH—.

In one embodiment of the invention, Z is represented by one of the following general formulae:

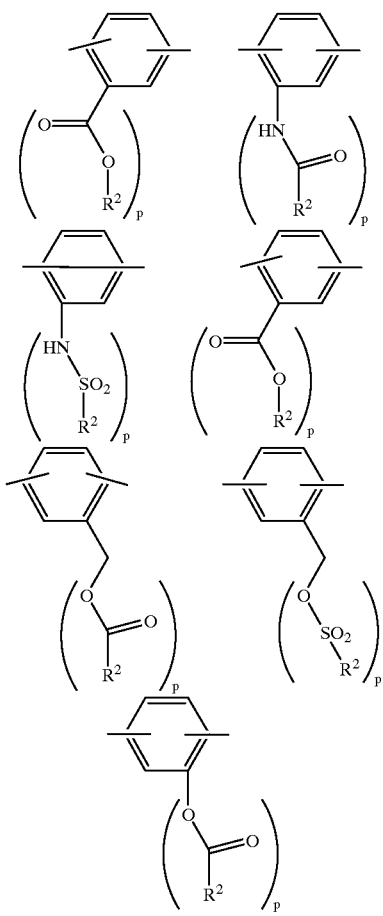

wherein $R^2$ represents a $C_{1-25}$ alkyl group or a fluoroalkyl group; and p is from 1 to 4.

In one embodiment of the invention, Z is —$CH_2CH(COOR^2)CH(COOR^2)CH_2$—, —$CH_2CH(OCOR^2)CH(OCOR^2)CH_2$—, —$CH_2C(CH_2COOR^2)_2CH_2$—, —$CH_2C(CH_2OCOR^2)_2CH_2$—, —$CH(CH_2COOR^2)CH(CH_2COOR^2)$—, —$CH(CH_2COOR^2)CH(CH_2OCOR^2)$— or —$CH_2CH(CH_2COOR^2)$—, wherein $R^2$ represents a $C_{1-25}$ alkyl group or a fluoroalkyl group.

The process according to the invention is a process for producing a polyimide involving the step of reacting an acid dianhydride with a diamine, wherein the polyimide contains a structure represented by the following general formula (I):

(I)

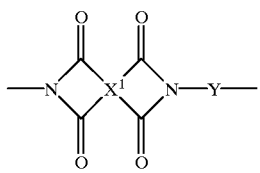

wherein $X^1$ represents a tetravalent organic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group); and Y represents a divalent organic group.

The process according to the invention is a process for producing a polyamic acid involving the step of reacting an acid dianhydride with a diamine, wherein the polyamic acid contains a structure represented by the following general formula (III):

(III)

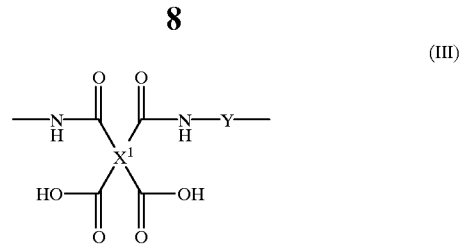

wherein $X^1$ represents a tetravalent organic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group); and Y represents a divalent organic group.

The process according to the invention is a process for producing an acid dianhydride involving the step of reacting a dihydroxybenzene derivative or a diaminobenzene derivative with an alkylating agent and a trimellitic acid anhydride derivative, wherein the acid dianhydride has a structure represented by the following general formula (V):

(V)

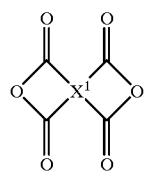

wherein $X^1$ is represented by the following general formula:

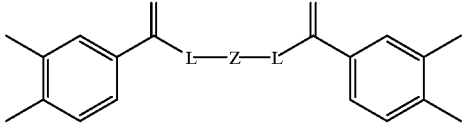

wherein Z represents a divalent aromatic or aliphatic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group); and L represents —O— or —NH—.

The gist of the invention relating to the novel polyimides resides in the acid dianhydrides substituted by a substituent having an alkyl or fluoroalkyl group and utilization thereof.

DESCRIPTION OF THE PREFERRED EMBODIMENTS

The novel polyimide according to the invention is a polyimide containing a structure represented by the following general formula (I):

(I)

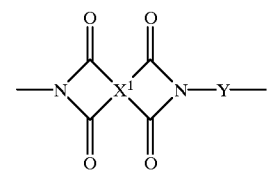

wherein $X^1$ represents a tetravalent organic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group); and Y represents a divalent organic group.

The novel polyamic acid according to the invention is a polyamic acid containing a structure represented by the following general formula (III):

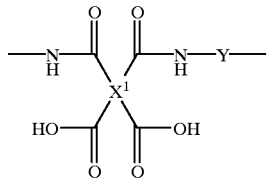
(III)

wherein $X^1$ represents a tetravalent organic group having a substituent $-R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group); and Y represents a divalent organic group.

The novel acid dianhydride according to the invention is an acid dianhydride having a structure represented by the following general formula (V):

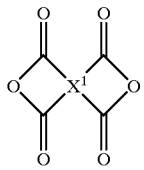
(V)

wherein $X^1$ represents a tetravalent organic group having a substituent $-R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group).

Next, embodiments of the novel polyimide according to the invention will be described by reference to particular structural examples thereof. However, the polyimide is not particularly restricted in structure, so long as it is a polyimide composition having an alkyl or fluoroalkyl group in a side chain of an acid dianhydride residue.

Particular examples of the process for producing the polyimide according to the invention include: 1) a process wherein an acid dianhydride having an alkyl or fluoroalkyl group is preliminarily synthesized and then reacted with an arbitrary diamine to give a polyamic acid followed by cyclodehydration thereby giving a polyimide; and 2) a process wherein 1 equivalent of an arbitrary diamine is reacted with 2 equivalents of trimellitic acid anhydride chloride or with 2 equivalents of trimellitic acid anhydride in the presence of a condensing agent to give a dicarboxylic acid which is then reacted with a diamine having an alkyl or fluoroalkyl group thereby giving a polyimide.

First, illustration will be made on the process 1) wherein an acid dianhydride having an alkyl or fluoroalkyl group is preliminarily synthesized and then reacted with an arbitrary diamine to give a polyamic acid followed by cyclodehydration thereby giving a polyimide.

As the acid dianhydride to be used as the starting material of the novel polyimide of the general formula (I), use may be made of those represented by the following general formulae (2-1), (2-2) and (2-3):

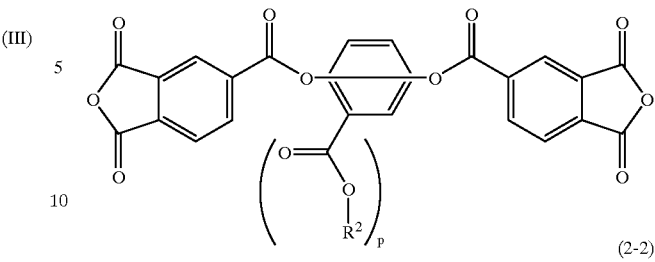
(2-1)

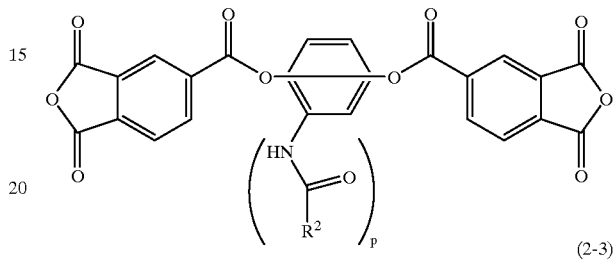
(2-2)

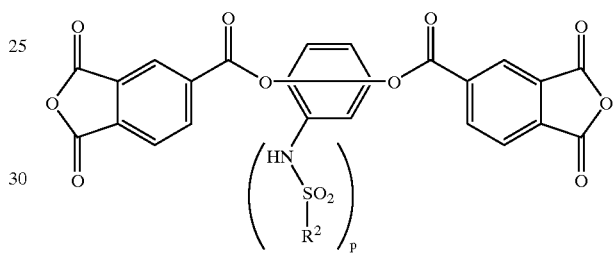
(2-3)

wherein $R^2$ represents a $C_{1-25}$ alkyl group or a fluoroalkyl group; and p is from 1 to 4.

As the acid dianhydride to be used as the starting material of the novel polyimide of the general formula (I), use may be also made of those represented by the following general formulae (2-4), (2-5), (2-6) and (2-7):

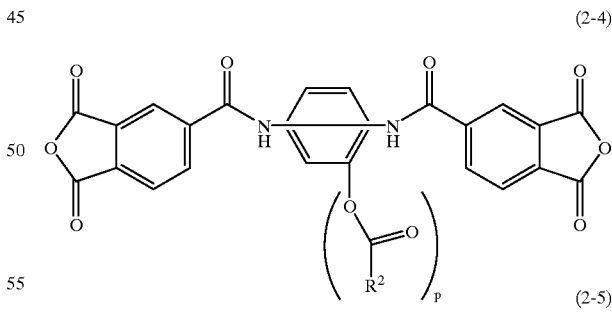
(2-4)

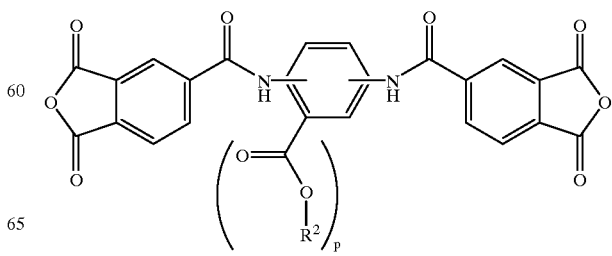
(2-5)

-continued

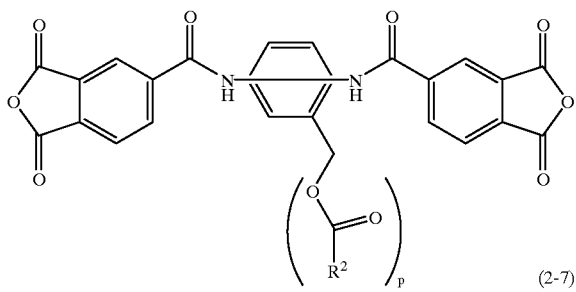

(2-6)

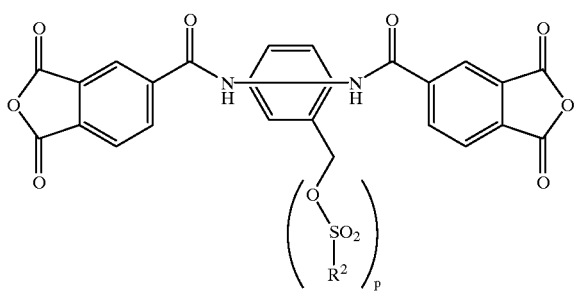

(2-7)

wherein $R^2$ represents a $C_{1-25}$ alkyl group or a fluoroalkyl group; and p is from 1 to 4.

As the acid dianhydride to be used as the starting material of the novel polyimide of the general formula (I), use may be also made of those represented by the following general formula (2-8):

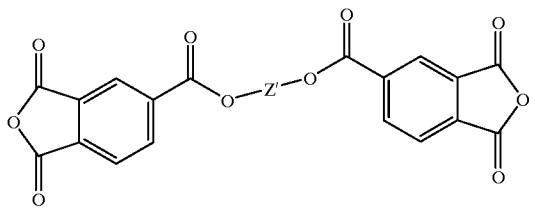

(2-8)

wherein Z' is —$CH_2CH(COOR^2)CH(COOR^2)CH_2$—, —$CH_2CH(OCOR^2)CH(OCOR^2)CH_2$—, —$CH_2C(CH_2COOR^2)_2CH_2$—, —$CH_2C(CH_2OCOR^2)_2CH_2$—, —$CH(CH_2COOR^2)CH(CH_2COOR^2)$— or —$CH(CH_2COOR^2)CH(CH_2OCOR^2)$—.

As the acid dianhydride to be used as the starting material of the novel polyimide of the general formula (I), use may be also made of those represented by the following general formula (2-9):

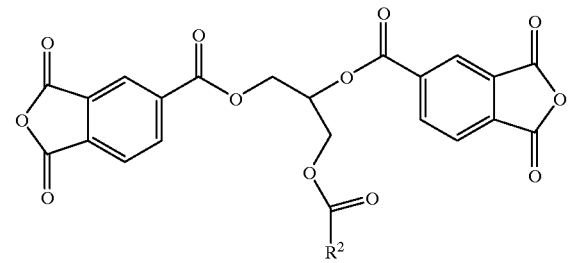

(2-9)

wherein $R^2$ represents a $C_{1-25}$ alkyl group or a fluoroalkyl group; and p is from 1 to 4.

Now, $R^1$ in the invention will be described. In case where the substituent —$R^1AR^2$ is attached to an aliphatic carbon atom, $R^1$ is a single bond or an alkylene group, preferably a single bond or a methylene group. In case where the substituent —$R^1AR^2$ is attached to an aromatic carbon atom, $R^1$ is always defined as a single bond.

Next, $R^2$ in the invention (i.e., a $C_{1-25}$ alkyl or fluoroalkyl group) will be described. A $C_{1-25}$ alkyl group means a —$C_hH_{2h+1}$ group (wherein h is from 1 to 25), while a $C_{1-25}$ fluoroalkyl group means a —$C_iH_jF_k$ group (wherein i is form 1 to 25 and j+k is 2i+1).

With respect to the carbon atom number of the alkyl or fluoroalkyl group, a carbon atom number of a certain extent is needed to achieve a low water absorption. When the carbon atom number is too large, the acid dianhydride becomes hardly soluble in solvents which are used in synthesizing an amic acid serving as a precursor of the polyimide. In this case, the acid dianhydride becomes waxy and thus can be hardly handled. Thus, the carbon atom number available herein ranges from 1 to 25, preferably from 3 to 20 and still preferably from 5 to 18. Preferable examples of the alkyl group include $C_{5-18}$ alkyl groups such as hexyl, heptyl, octyl, nonyl and decyl groups.

In case where $R^2$ is a fluoroalkyl group —$C_iH_jF_k$, k is 1 or more, j is 0 or more and j+k preferably ranges from 3 to 51, more preferably from 7 to 41 and most preferably from 11 to 37. Preferable examples of the fluoroalkyl group include —$CH_2CH_2(CF_2)_4CF_3$ to —$CH_2CH_2(CF_2)_{14}CF_3$ and —$(CF_2)_2CF_3$ to —$(CF_2)_{16}CF_3$ having 1 to 25, preferably 3 to 20 and still preferably 5 to 18, carbon atoms.

Now, particular examples of the process for producing a novel acid dianhydride will be described.

First, an example of the process for producing novel acid dianhydrides represented by the general formula (2-1) as shown above will be illustrated.

An alkali metal (Li, Na, K, Rb, Cs, Fr) salt of dihydroxybenzenecarboxylic acid is reacted with $R^2$—Q' (wherein Q' represents a halogen other than fluorine) in an aprotic polar solvent under heating to give $(HO)_2$—$C_6H_3$—$COOR^2$. This product is reacted with 2 times by mol as much trimellitic acid anhydride chloride or with 2 times by mol as much trimellitic acid anhydride in the presence of a condensing agent to thereby give a novel acid dianhydride represented by the general formula (2-1). Compounds wherein p is from 2 to 4 can be obtained by substituting the dihydroxybenzenecarboxylic acid respectively by dihydroxybenzenedicarboxylic acid, dihydroxybenzenetricarboxylic acid and dihydroxybenzenetetracarboxylic acid.

Next, an example of the process for producing novel acid dianhydrides represented by the general formula (2-2) will be illustrated.

$(HO)_2$—$C_6H_3$—$NHCOR^2$ can be obtained by reacting dihydroxyaminobenzene with $R^2COCl$ or with $R^2OOH$ in the presence of a condensing agent. Then this product is reacted with 2 times by mol as much trimellitic acid anhydride chloride or with 2 times by mol as much trimellitic acid anhydride in the presence of a condensing agent to thereby give a novel acid dianhydride represented by the general formula (2-2). Compounds wherein p is from 2 to 4 can be obtained by substituting the dihydroxyaminobenzene respectively by dihydroxydiaminobenzene, dihydroxytriaminobenzene and dihydroxytetraaminobenzene.

Next, an example of the process for producing novel acid dianhydrides represented by the general formula (2-3) will be illustrated.

Compounds represented by the general formula (2-3) can be obtained as in the case of the compounds of the general formula (2-2) but substituting $R^2COCl$ by $R^2SO_2Cl$.

Next, an example of the process for producing novel acid dianhydrides represented by the general formula (2-4) will be illustrated.

Novel acid dianhydrides represented by the general formula (2-4) can be obtained by reacting diaminodihydroxybenzene with 2 times by mol as much trimellitic acid chloride and then with $R^2COCl$. Compounds wherein p is from 2 to 4 can be obtained by using diaminodihydroxybenzene, diaminotrihydroxybenzene and diaminotetrahydroxybenzene.

Next, an example of the process for producing novel acid dianhydrides represented by the general formula (2-5) will be illustrated.

An alkali metal (Li, Na, K, Rb, Cs, Fr) salt of diaminobenzenecarboxylic acid is reacted with $R^2$—Q' (wherein Q' represents a halogen other than fluorine) in an aprotic polar solvent under heating to give $(H_2N)_2$—$C_6H_3$—$COOR^2$. This product is reacted with 2 times by mol as much trimellitic acid anhydride chloride or with 2 times by mol as much trimellitic acid anhydride in the presence of a condensing agent to thereby give a novel acid dianhydride represented by the general formula (2-5). Compounds wherein p is from 2 to 4 can be obtained by substituting the diaminobenzenecarboxylic acid respectively by diaminobenzenedicarboxylic acid, diaminobenzenetricarboxylic acid and diaminobenzenetetracarboxylic acid.

Next, an example of the process for producing novel acid dianhydrides represented by the general formula (2-6) will be illustrated.

Novel acid dianhydrides represented by the general formula (2-6) can be obtained by reacting diaminobenzyl alcohol with 2 times by mol as much trimellitic acid chloride and then with $R^2COCl$. Compounds wherein p is from 2 to 4 can be obtained by substituting the diaminobenzyl alcohol respectively by $(H_2N)_2C_6H_2(CH_2OH)_2$, $(H_2N)_2C_6H(CH_2OH)_3$ and $(H_2N)_2C_6(CH_2OH)_4$.

Next, an example of the process for producing novel acid dianhydrides represented by the general formula (2-7) will be illustrated.

Compounds represented by the general formula (2-7) can be obtained as in the case of the compounds of the general formula (2-6) but substituting $R^2COCl$ by $R^2SO_2Cl$.

Next, an example of the process for producing novel acid dianhydrides represented by the general formula (2-8) will be illustrated.

$HOCH_2CH(OH)CH_2$—$OCOR^2$ can be obtained by reacting $HOCH_2CH(OH)CH_2$—Q (wherein Q represents a halogen) with an alkali metal salt of $R^2COOH$ in an aprotic polar solvent under heating. This product is reacted with 2 times by mol as much trimellitic acid anhydride chloride or with 2 times by mol as much trimellitic acid anhydride in the presence of a condensing agent to thereby give a novel acid dianhydride represented by the general formula (2-8).

Next, an example of the process for producing novel acid dianhydrides represented by the general formula (2-9) will be illustrated.

$(HOCH_2)_2C(CH_2OCOR^2)_2$ can be obtained by reacting, for example, $(HOCH_2)_2C(CH_2Q)_2$ (wherein Q represents a halogen) with an alkali metal salt of $R^2COOH$ in an aprotic polar solvent under heating. This product is reacted with 2 times by mol as much trimellitic acid anhydride chloride or with 2 times by mol as much trimellitic acid anhydride in the presence of a condensing agent to thereby give a novel acid dianhydride represented by the general formula (2-9). Acid dianhydrides having corresponding structures can be obtained by the same procedure but substituting $(HOCH_2)_2C(CH_2Q)_2$ by HO—$CH_2CHQCHQCH_2$—OH or $QCH_2CH(OH)CH(OH)CH_2Q$.

Novel acid dianhydrides represented by the general formula (2-9) can be obtained by reacting an alkali metal salt of $HOCH_2CH(COOH)CH(COOH)CH_2OH$, $HOCH_2C(CH_2COOH)_2CH_2OH$ or $CH_2(COOH)CH(OH)CH(OH)CH_2(COOH)$ in an aprotic polar solvent under heating and then reacting this product with 2 times by mol as much trimellitic acid anhydride chloride or with 2 times by mol as much trimellitic acid anhydride in the presence of a condensing agent.

The acid dianhydrides represented by the general formulae (2-1) to (2-9) obtained by the reactions as described above are examples which are particularly useful as monomers of the novel polyimides. Other acid dianhydrides represented by the general formula (V) can be also obtained in accordance with one of these processes with the combined use of known starting compounds and reactions.

Next, a process for synthesizing a polyimide via a polyamic acid will be described by way of example.

A polyimide can be obtained by reacting a novel acid dianhydride represented by one of the general formulae (2-1) to (2-9) obtained above with a diamine in an organic polar solvent to give a polyamic acid and then thermally or chemically imidating the polyamic acid.

In this reaction, either a single acid dianhydride or a mixture of two or more acid dianhydrides may be used as the acid dianhydride. Similarly, either a single diamine or a mixture of two or more diamines may be used.

The term "thermally imidate" as used herein means a method wherein a polyamic acid is converted into a polyimide by merely heating.

The term "chemically imidate" as used herein means a method wherein a dehydrating agent in a stoichiometric amount or more and a basic catalyst are added to a polyamic acid polymer or its solution and then imidataion is carried out by heating.

The dehydrating agent as used herein is exemplified by aliphatic acid anhydrides (for example, acetic anhydride) and aromatic acid anhydrides. The basic catalyst is exemplified by aliphatic tertiary amines (for example, triethylamine), aromatic tertiary amines (for example, dimethylaniline) and heterocyclic tertiary amines (for example, pyridine, picoline, isoquinoline).

It is desirable that the polyamic acid has an average molecular weight of from 5,000 to 1,000,000. In case where it has an average molecular weight less than 5,000, the resultant polyimide has only a low molecular weight. It is undesirable to use this polyimide as such as a photoreactive resin, since there arises an undesirable problem that the resin becomes brittle. It is also undesirable that the average molecular weight of the polyamic acid exceeds 1,000,000, since there arises another problem in this case that the polyamic acid varnish becomes too viscous and shows poor handling properties.

Examples of the organic polar solvent to be used in the reaction of producing the polyamic acid include sulfoxide solvents (for example, dimethyl sulfoxide, diethyl sulfoxide), formamide solvents (for example, N,N-dimethylformamide, N,N-diethylformamide), acetamide solvents (for example, N,N-dimethylacetamide, N,N-diethylacetamide), pyrrolidone solvents (for example, N-methyl-2-pyrrolidone, N-vinyl-2-pyrrolidone), phenol solvents (for example, phenol, o-, m -or p-cresol, xylenol, halogenated phenols, catechol), hexamethylphosphoramide and γ-butyrolactone. Although it is desirable to use one of these solvents or a mixture thereof, it is also possible to use aromatic hydrocarbons (for example, xylene, toluene) as a part of the solvent.

To synthesize the polyimides having an alkyl or fluoroalkyl group according to the invention, use can be made of the acid dianhydrides represented by the general formulae (2-1) to (2-9) of the invention together with other acid dianhydrides, so long as the content of the acid dianhydrides represented by the general formulae (2-1) to (2-9) of the invention amounts to 1% or more of the total acid dianhydrides.

The other acid dianhydrides are not particularly restricted so long as they are acid dianhydrides. For example, use may be made therefor of aliphatic or alicyclic tetracarboxylic acid dianhydrides (for example, butanetetracarboxylic acid dianhydride, 1,2,3,4-cyclobutanetetracarboxylic acid dianhydride, 1,3-dimethyl-1,2,3,4-cyclobutanetetracarboxylic acid, 1,2,3,4-cyclopentanetetracarboxylic acid dianhydride, 2,3,5-tricarboxycylcopentylacetic acid dianhydride, 3,5,6-tricarboxynorbonane-2-acetic acid dianhydride, 2,3,4,5-tetrahydrofurantetracarboxylic acid dianhydride, 5-(2,5-dioxotetrahydrofural)-3-methyl-3-cyclohexene- 1,2-dicarboxylic acid dianhydride, bicyclo[2,2,2]-oct-7-ene-2,3, 5,6-tetracarboxylic acid dianhydride); aromatic tetracarboxylic acid dianhydrides (for example, pyromellitic acid dianhydride, 3,3',4,4'-benzophenonetetracarboxylic acid dianhydride, 3,3'4,4'-biphenylsulfonetetracarboxylic acid dianhydride, 1,4,5,8-naphthalenetetracarboxylic acid dianhydride, 2,3,6,7-naphthalenetetracarboxylic acid dianhydride, 3,3',4,4'-biphenyl ether tetracarboxylic acid dianhydride, 3,3',4,4'-dimethyldiphenylsilanetetracarboxylic acid dianhydride, 3,3',4,4'-tetraphenylsilanetetracarboxylic acid dianhydride, 1,2,3,4-furantetracarboxylic acid dianhydride, 4,4'-bis(3,4-dicarboxyphenoxy)diphenylsulfide dianhydride, 4,4'-bis(3, 4-dicarboxyphenoxy)diphenylsulfone dianhydride, 4,4'-bis (3,4-dicarbophenoxy)diphenylpropane dianhydride, 3,3',4, 4'-perfluoroisopropylidenediphthalic acid dianhydride, 3,3', 4,4'-biphenyltetracarboxylic acid dianhydride, bis(phthalic acid) phenylphosphine oxide dianhydride, p-phenylene-bis (triphenylphthalic acid) dianhydride, m-phenylene-bis (triphenylphthalic acid) dianhydride, bis (triphenylphthalic acid)-4,4'-diphenyl ether dianhydride, bis (triphenylphthalic acid)-4,4'-diphenylmethane dianhydride); 1,3,3a,4,5,6,9b-hexahydro-2,5-dioxo-3-furanyl)-naphth[1,2-c]furan-1,3-dione, 1,3,3a,4,5,9b-hexahydro-5-methyl-5-(tetrahydro-2,5-dioxo-3-furanyl)-naphth[1,2-c]furan-1,3-dione and 1,3,3a,4, 5,9b-hexahydro-8-methyl-5-(tetrahydro-2,5-dioxo-3-furanyl)-naphth[1,2-c]furan-1,3-dione.

Further examples of the acid dianhydrides usable herein include aliphatic tetracarboxylic acid dianhydrides having aromatic rings, for example, compounds represented by the flowing general formula (3):

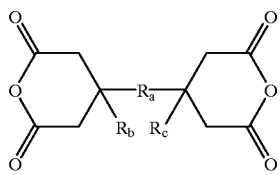

(3)

wherein Ra represents a divalent organic group having an aromatic ring; and Rb and Rc represent each a hydrogen atom or an alkyl group;
and compounds represented by the following general formula (4):

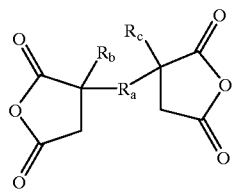

(4)

wherein Ra, Rb and Rc are each as defined above.

These acid dianhydrides may be used either alone or as a combination of two or more thereof.

As the diamine to be used in the polyimide, various diamines are usable in addition to diamines having a cinnamic acid skeleton. Arbitrary diamines may be used without restriction. Examples thereof include aromatic diamines (for example, p—phenylenediamine, m—phenylenediamine, 4,4'-diaminodiphenylmethane, 4,4'-diaminophenylethane, 4,4'-diaminophenyl ether, 4,4'-didiaminophenyl sulfide, 4,4'-didiaminophenyl sulfone, 1,5-diaminonaphthalene, 3,3-dimethyl-4,4'-diaminobiphenyl, 5-amino-1-(4'-aminophenyl)-1,3,3-trimethylindan, 6-amino-1-(4'-aminophenyl) 1,3,3-trimethylindan, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl) hexafluoropropane, 4,4'-methylene-bis(2-chloroaniline), 2,2',5,5'-tetrachloro-4,4'-diaminobiphenyl, 2,2'-dichloro-4, 4'-diamino-5,5'-dimethoxybiphenyl, 3,3'-dimethoxy-4,4'-diaminobiphenyl, 4,4'-diamino-2,2'-bis(trifluoromethyl) biphenyl, 2,2-bis[4-(4-aminophenoxy)phenyl]propane, 2,2-bis[4-(4-aminophenoxy)phenyl]hexafluoropropane, 1,4-bis (4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenyleneisopropylidene) bisaniline, 4,4'-(m-phenyleneisopropylidene)bisaniline, 2,2'-bis[4-(4-amino-2-trifluoromethylphenoxy)phenyl] hexafluoropropane, 4,4'-bis[4-(4-amino-2-trifluoromethyl) phenoxy]-octafluorobiphenyl); aromatic diamines having two amino groups bonded to an aromatic ring and hetero atom(s) other than the nitrogen atoms in these amino groups (for example, diaminotetraphenylthiophene); and aliphatic diamines and alicyclic diamines (for example, 1,1-metaxylylenediamine, 1,3-propanediamine, tetramethylenediamine, pentamethylenediamine, octamethylenediamine, nonamethylenediamine, 4,4-diaminoheptamethylenediamine, 1,4-diaminocycloheaxne, isophoronediamine, tetrahydrodicyclopentadienylenediamine, hexahydro-4,7-methanoindanylenedimethylenediamine, tricyclo[6,2,1, 02.7]-undecylenedimethyldiamine, 4,4'-methylenebis (cyclohexylamine)).

Further examples of the diamine usable herein include, for example, mono-substituted phenylenediamines represented by the following general formula (5):

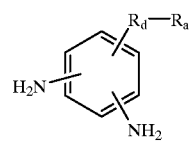

(5)

wherein Rd represents a divalent organic group selected from among —O—, —COO—, —OCO—, —CONH— and —CO—; and Re represents a monovalent organic group having a steroid skeleton;

and compounds represented by the following general formula:

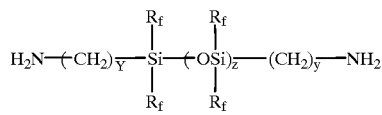

wherein Rf represents a $C_{1-12}$ hydrocarbon group; y is an integer of from 1 to 3; and z is an integer of from 1 to 20.

Further examples of the diamine include diamines having a photosensitive group, for example, 2'-(3,5-diaminobenzoate)-chalcone, 7'-(3,5-diaminobenzoate)-coumarin, (3,5-diaminobenzoate)-cinnamic acid, coumarin-3-carboxylate-(3,5-diaminobenzyl), coumarin-3-carboxylate-1-(3,5-diaminophenyl ester), 1-(3,5-diaminophenoxy)-2-(cumarin-3-carboxylate)ethane, 1-(3,5-diaminophenoxy)-2-(α-pyrone-5-carboxylate)ethane, 3-(3,5-diaminobenzoate)-propionate-(2-chalcone), 1-(3,5-diaminobenzoate)-2-(coumarin-3-carboxylate)ethane, 1-(3,5-diaminophenyl)-coumarin-3-carboxamide, 3,5-diaminobenzyl cinnamate, 3,5-diaminophenyl cinnamate, 2-(2,4-diaminophenoxy)ethyl1-cinnamate, 2-(2,4-diaminophenoxy)ethyl-1-cinnamate, 2-(3,5-diaminobenzoic acid)propyl-1-cinnamate, (4'-aminophenyl)-4-aminocinnamate, (3-aminophenyl)-3-aminocinnamate, 1'-amino-2'-naphthyl-(3-aminocinnamate), 1,3-bis(4-aminocinnamic acid)benzene and 1,2-bis(4-aminocinnaic acid)ethyl. Either one of these diamine compounds or a combination of two or more thereof may be used.

Next, the process 2) wherein 1 equivalent of an arbitrary diamine is reacted with 2 equivalents of trimellitic acid anhydride chloride or with 2 equivalents of trimellitic acid anhydride in the presence of a condensing agent to give a dicarboxylic acid which is then reacted with a diamine having an alkyl or fluoroalkyl group thereby giving a polyimide will be illustrated as another example of the process for producing the polyimide according to the invention.

An arbitrary diamine ($H_2N$—Y—$NH_2$) is reacted with trimellitic acid anhydride and subjected to cyclodehydration to give a dicarboxylic acid represented by the following general formula:

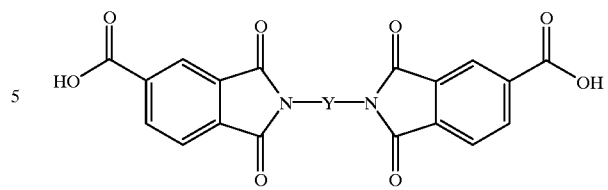

wherein Y represents a divalent organic group.

Next, this dicarboxylic acid is reacted with a diol or a diamine represented by one of the following general formulae:

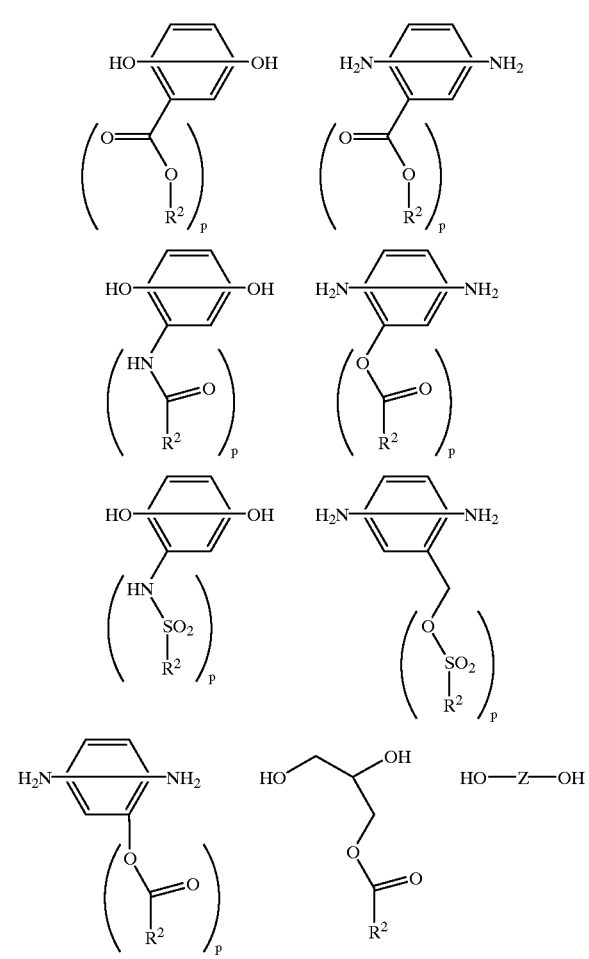

wherein Z represents —$CH_2CH(COOR^2)CH(COOR^2)CH_2$—, —$CH_2CH(OCOR^2)CH(OCOR^2)CH_2$—, —$CH_2C(CH_2COOR^2)_2CH_2$—, —$CH_2C(CH_2OCOR^2)_2CH_2$—, —$CH(CH_2COOR^2)CH(CH_2COOR^2)$— or —$CH(CH_2COOR^2)CH(CH_2OCOR^2)$—;
in the presence of a condensing agent to thereby give the desired polyimide having an alkyl or fluoroalkyl group.

The process for producing the polyimide according to the invention is not restricted to the processes as described above. A polyimide having an alkyl or fluoroalkyl group can be obtained by reacting 1 equivalent of diamines having an alkyl or fluoroalkyl group employed in the synthesis of the acid dianhydrides of general formulas (2-5), (2-6) and (2-7) (or a mixture of these diamines with other arbitrary diamines) with 1 equivalent of trimellitic acid anhydride chloride or with 1 equivalent of trimellitic acid anhydride in the presence of a condensing agent.

The polyimides according to the invention thus obtained may be mixed with various organic additives or inorganic fillers or various reinforcing agents to thereby provide compositions containing the polyimides.

One of the characteristics of the novel polyimides of the invention obtained by the above processes resides in having a low water absorption, which makes these polyimides appropriate for various uses.

The water absorption of the polyimides of the invention, measured in accordance with ASTM D570 under the conditions as employed in Example 1, is typically 1.8% or less, preferably 1.5% or less.

Now, the invention will be described in greater detail by reference to the following Examples. However, it is to be understood that the invention is not construed as being limited thereto.

In the following Examples, ESDA means 2,2-bis(4-hydroxyphenyl)propanedibenzoate-3,3',4,4'-tetracarboxylic acid dianhydride; 6FDA means 2,2'-hexafluoropropylidenediphthalic acid dianhydride; BAPS-M means bis[4-(3-aminophenoxy)phenyl]sulfone; DMAc means N,N-dimethylacetamide; and DMF means N,N-dimethylformamide.

Weight-average molecular weight was measured by using GPC (manufactured by Waters) under the following conditions: columns (2): KD-806M manufactured by Shodex, 60° C., detector: RI, flow rate: 1 ml/min, developing solvent: DMF (lithium Ibromide 0. 03M, phosphoric acid 0.03 M), sample concentration: 0.2 wt %, injection: 20 $\mu$l, standard: polyethylene oxide.

Water absorption was measured in accordance with ASTM D570.

In the following Examples 1 to 9, acid dianhydrides according to the invention and polyimides with the use thereof were produced.

EXAMPLE 1

Synthesis of 2,5-Dihydroxybenzenecarboxylic Octane:

1 mol of 2,5-dihydroxybenzoic acid and 0.5 mol of cesium carbonate were added to 200 ml of acetone and 200 ml of water and dissolved therein by stirring. After completely dissolving, the resultant solution was concentrated to dryness to give 1 mol of cesium 2,5-dihydroxybenzoate. 85.8 g (0.3 mol) of cesium 2,5-dihydroxybenzoate, 57.9 g (0.3 mol) of bromooctane and 300 ml of DMF were introduced into a reactor and reacted under a nitrogen gas stream at 100° C. for 3 hours. The reaction solution was concentrated, washed with water and dried to give 78 g (0.29 mol) of 2,5-dihydroxybenzenecarboxylic octane.

Synthesis of 2,5-(Benzenecarboxylic Octane)-dibenzoate-3,3',4,4'-tetracarboxylic Acid Dianhydride:

111.6 g (0.53 mol) of trimellitic acid anhydride chloride and 600 ml of toluene were introduced into a reactor and dissolved by stirring under a nitrogen gas stream at about 70° C. 69.3 g (0.26 mol) of 2,5-dihydroxybenzenecarboxylic octane and 50 g of pyridine were dissolved in 500 ml of toluene and the resultant solution was dropped into the reactor as described above. After the completion of the addition, the mixture was stirred and refluxed under nitrogen for about 2 hours. After the completion of the reaction, the reactor was ice-cooled and the trimellitic acid anhydride chloride and pyridine hydrochloride thus precipitated were removed by filtration. The filtrate was concentrated and the solid matter thus obtained was recrystallized from acetic anhydride to thereby give 120 g of 2,5-(benzenecarboxylic octane)-dibenzoate-3,3',4,4'-tetracarboxylic acid dianhydride.

The thus obtained compound was determined using a dimethyl sulfoxide-$d_6$. (DMSO-$d_6$)/deuterochloroholm (CDCl$_3$) solvent by means of PMX60si NMR spectrometer (manufactured by LEOL LTD.).

(diol)

$\delta$ 0.65–1.80 (m, —(CH$_2$)$_6$CH$_3$, 15H)

$\delta$ 4.30 (t, COOCH$_2$—, 2H)

$\delta$ 6.66–7.33 (m, Ph-H, 3H)

$\delta$ 8.15 (s, OH, 1H)

$\delta$ 10.20 (s, OH, 1H)

(acid dianhydride)

$\delta$ 0.65–1.80 (m, —(CH$_2$)$_6$CH$_3$, 15H)

$\delta$ 4.16 (t, COOCH$_2$—, 2H)

$\delta$ 7.60–8.20 (m, Ph-H, 3H)

$\delta$ 8.20–8.83 (m, Ph-H, 6H)

4.32 g (0.01 mol) of BAPS-M and 30 g of DMAc were introduced into a 300 ml separable flask provided with a stirrer. Then 4.84 g (0.01 mol) of the acid dianhydride of Example 1 was added at once thereto under vigorously stirring and stirring was continued as such for 30 minutes. 0.93 g (0.02 mol) of $\beta$-picoline, 5 g of acetic anhydride and 10 g of DMAc were added to the reaction solution and the resultant mixture was heated to about 120° C. for imidation. These reactions were carried out under a nitrogen gas stream. After the completion of the reaction, the reaction mixture was poured into methanol, filtered and dried to thereby give 8.2 g of a yellow polyimide powder. This polyimide powder had a weight-average molecular weight of 80,000. The polyimide was dissolved in DMF and cast on a PET film. After drying at 130° C. for 5 minutes, the PET film was stripped and drying was further effected at 150° C. for 10 minutes to thereby give a film of 25 $\mu$m in thickness. This film showed a water absorption of 0.5%.

EXAMPLE 2

2,5-(Benzenecarboxylic nonadecafluorooctane)-dibenzoate-3,3',4,4'-tetracarboxylic acid dianhydride was obtained as in Example 1 but using Br—CH$_2$CH$_2$(CF$_2$)$_7$CF$_3$ as a substitute for bromooctane.

4.32 g (0.01 mol) of BAPS-M and 30 g of DMAC were introduced into a 300 ml separable flask provided with a stirrer. Then 9.48 g (0.01 mol) of the acid dianhydride of this Example was added at once thereto under vigorously stirring and stirring was continued as such for 30 minutes. 0.93 g (0.02 mol) of $\beta$-picoline, 5 g of acetic anhydride and 10 g of DMAc were added to the reaction solution and the resultant mixture was heated to about 120° C. for imidation. These reactions were carried out under a nitrogen gas stream. After the completion of the reaction, the reaction mixture was poured into methanol, filtered and dried to thereby give 13 g of a yellow polyimide powder. This polyimide powder had a weight-average molecular weight of 80,000. A film was formed as in Example 1 and the water absorption was measured. As a result, this film showed a water absorption of 0.4%.

EXAMPLE 3

Synthesis of 2,5-Dihydroxybenzene-1,6-dicarboxylic Octane:

0.5 mol of 2,5-dihydroxyterephthalic acid and 0.5 mol of cesium carbonate were added to 200 ml of acetone and 200 ml of water and dissolved therein by stirring. After completely dissolving, the resultant solution was concentrated to dryness to give 0.5 mol of cesium 2,5-dihydroxyterephthalate. 46.2 g (0.1 mol) of cesium 2,5-dihydroxyterephthalate, 38.62 g (0.2 mol) of bromooctane and 400 ml of DMF were introduced into a reactor and reacted under a nitrogen gas stream at 100° C. for 3 hours. The reaction solution was concentrated, washed with water and dried to give 40.1 g (0.95 mol) of 2,5-dihydroxybenzene-1,6-dicarboxylic octane.

Synthesis of 2,5-(benzene-1,6-dicarboxylic octane)-dibenzoate-3,3',4,4'-tetracarboxylic Acid Dianhydride:

35.8 g (0.17 mol) of trimellitic acid anhydride chloride and 200 ml of toluene were introduced into a reactor and dissolved by stirring under a nitrogen gas stream at about 70° C. 33.8 g (0.08 mol) of 2,5-dihydroxybenzene-1,6-dicarboxylic octane and 16 g of pyridine were dissolved in 150 ml of toluene and the resultant solution was dropped into the reactor as described above. After the completion of the addition, the mixture was stirred and refluxed under nitrogen for about 2 hours. After the completion of the reaction, the reactor was ice-cooled and the trimellitic acid anhydride chloride and pyridine hydrochloride thus precipitated were removed by filtration. The filtrate was concentrated and the solid matter thus obtained was recrystallized from acetic anhydride to thereby give 38.5 g of 2,5-(benzene-1,6-dicarboxylic octane)-dibenzoate-3,3',4,4' tetracarboxylic acid dianhydride.

The thus obtained compound was determined using a dimethyl sulfoxide-$d_6$, (DMSO-$d_6$)/deuterochloroholm (CDCl$_3$) solvent by means of PMX60si NMR spectrometer (manufactured by LEOL LTD.).

(diol)

δ 0.66–2.00 (m, —(CH$_2$)$_6$CH$_3$, 30H)

δ 4.33 (t, COOCH$_2$—, 4H)

δ 7.40 (s, Ph-H, 2H)

(acid dianhydride)

δ 0.66–1.80 (m, —(CH$_2$)$_6$CH$_3$, 30H)

δ 4.20 (t, COOCH$_2$—, 4H)

δ 8.00 (m, Ph-H, 2H)

δ 8.10–8.90 (m, Ph-H, 6H)

4.32 g (0.01mol) of BAPS-M and 30 g of DMAc were introduced into a 300 ml separable flask provided with a stirrer. Then 7.7 g (0.01 mol) of the acid dianhydride of this Example was added at once thereto under vigorously stirring and stirring was continued as such for 30 minutes. 0.93 g (0.02 mol) of β-picoline, 5 g of acetic anhydride and 10 g of DMAc were added to the reaction solution and the resultant mixture was heated to about 120° C. for imidation. These reactions were carried out under a nitrogen gas stream. After the completion of the reaction, the reaction mixture was poured into methanol, filtered and dried to thereby give 11.2 g of a yellow polyimide powder. This polyimide powder had a weight—average molecular weight of 80,000. A film was formed as in Example 1 and the water absorption was measured. As a result, this film showed a water absorption of 0.3%.

EXAMPLE 4

Synthesis of 2,4-Dihydroxybenzanilide Octane:

37.5 g (0.3mol) of 2,4-dihydroxyaniline, 40.4 g (0.4mol) of triethylamine and 200 ml of water were introduced into a reactor and vigorously stirred under a nitrogen gas stream. 53.0 g (0.3 mol) of pelargonic acid chloride was dissolved in 200 ml of THF (tetrahydrofuran) and the obtained solution was added to the reaction solution as described above. After vigorously stirring, the THF layer was separated by using a separating funnel, dehydrated over anhydrous magnesium sulfate, concentrated to dryness and then purified by recrystallization to thereby give 53.0 g of 2,4-dihydroxybenzanilide octane.

Synthesis of 2,4-(Benzanilide octane)-dibenzoate-3,3',4,4'-tetracarboxylic Acid Dianhydride:

84.2 g (0.4 mol) of trimellitic acid anhydride chloride and 500 ml of toluene were introduced into a reactor and dissolved by stirring under a nitrogen gas stream at about 70° C. 53.0 g (0.2 mol) of 2,4-dihydroxybenzanilide octane and 40 g of pyridine were dissolved in 500 ml of toluene and the resultant solution was dropped into the reactor as described above. After the completion of the addition, the mixture was stirred and refluxed under a nitrogen stream for about 2 hours. After the completion of the reaction, the reactor was ice-cooled and the trimellitic acid anhydride chloride and pyridine hydrochloride thusprecipitatedwereremovedbyfiltration. The filtrate was concentrated and the solid matter thus obtained was recrystallized from acetic anhydride to thereby give 74.0 g of 2,4-(benzanilide octane)-dibenzoate-3,3',4,4'-tetracarboxylic acid dianhydride.

4.32 g (0.01 mol) of BAPS-M and 30 g of DMAc were introduced into a 300 ml separable flask provided with a stirrer. Then 4.84 g (0.01 mol) of the acid dianhydride of this Example was added at once thereto under vigorously stirring and stirring was continued as such for 30 minutes. 0.93 g (0.02 mol) of β-picoline, 5 g of acetic anhydride and 10 g of DMAc were added to the reaction solution and the resultant mixture was heated to about 120° C. for imidation. These reactions were carried out under a nitrogen gas stream. After the completion of the reaction, the reaction mixture was poured into methanol, filtered and dried to thereby give 8.5 g of a yellow polyimide powder. This polyimide powder had a weight-average molecular weight of 70,000. A film was formed as in Example 1 and the water absorption was measured. As a result, this film showed a water absorption of 0.9%.

EXAMPLE 5

2,4-(Amide octane benzsulfonate)-dibenzoate-3,3',4,4'-tetracarboxylic acid dianhydride was obtained as in Example 4 but using octanesulfonic acid chloride as a substitute for the pelargonic acid chloride.

4.32 g (0.01 mol) of BAPS-M and 30 g of DMAc were introduced into a 300 ml separable flask provided with a stirrer. Then 6.49 g (0.01 mol) of the acid dianhydride of this Example was added at once thereto under vigorously stirring and stirring was continued as such for 30 minutes. 0.93 g (0.02 mol) of β-picoline, 5 g of acetic anhydride and 10 g of DMAC were added to the reaction solution and the resultant mixture was heated to about 120° C. for imidation. These reactions were carried out under a nitrogen gas stream. After the completion of the reaction, the reaction mixture was poured into methanol, filtered and dried to thereby give 10 g of a yellow polyimide powder. This polyimide powder had a weight-average molecular weight of 80,000. A film was formed as in Example 1 and the water absorption was measured. As a result, this film showed a water absorption of 0.9%.

EXAMPLE 6

3,5-(Benzenecarboxylic octane)-dibenzamide-3,3',4,4'-tetracarboxylic acid dianhydride was obtained as in Example 1 but using 3,5-diaminobenzoic acid as a substitute for the 2,5-dihydroxybenzoic acid.

4.32 g (0.01 mol) of BAPS-M and 30 g of DMAc were introduced into a 300 ml separable flask provided with a stirrer. Then 6.1 g (0.01 mol) of the acid dianhydride of this Example was added at once thereto under vigorously stirring and stirring was continued as such for 30 minutes. 0.93 g (0.02 mol) of β-picoline, 5 g of acetic anhydride and 10 g of DMAc were added to the reaction solution and the resultant mixture was heated to about 120° C. for imidation. These reactions were carried out under a nitrogen gas stream. After the completion of the reaction, the reaction mixture was poured into methanol, filtered and dried to thereby give 9.5 g of a yellow polyimide powder. This polyimide powder had a weight-average molecular weight of 90,000. A film was formed as in Example 1 and the water absorption was measured. As a result, this film showed a water absorption of 1.1%.

EXAMPLE 7

39.6 g (0.2mol) of 3,5-dinitrobenzyl alcohol, 23.7 g (0.3 mol) of pyridine and 200 ml of methyl ethyl ketone were introduced into a reactor and dissolved by stirring under a nitrogen gas stream at about 70° C. 35.3 g (0.2 mol) of pelargonic acid chloride was dissolved in 100 ml of methyl ethyl ketone and the resultant solution was added dropwise into the reactor as described above. After the completion of the addition, the mixture was refluxed and stirred under nitrogen for about 2 hours. Then the reactor was cooled by allowing to stand and pyridine hydrochloride was removed by filtration. The filtrate was concentrated and purified by using a column to give 50.8 g of 3,5-dinitrobenzyl pelargonate. 33.8 g of 3,5-dinitrobenzyl pelargonate and 4 g of a catalyst (5% palladium carried on active carbon) were introduced into a hydrogenation apparatus and reduced with hydrogen. After filtration and concentration, 27.8 g (0.1 mol) of 3,5-diaminobenzyl pelargonate was obtained.

42.1 g (0.2 mol) of trimellitic acid anhydride chloride and 300 ml of methyl ethyl ketone were introduced into a reactor and stirred with ice-coolingunder a nitrogen gas stream. 27.8 g (0.1 mol) of 3,5-diaminobenzyl pelargonate and 23.7 g (0.3 mol) of pyridine were dissolved in 300 ml of methyl ethyl ketone and the obtained solution was dropped into the reactor as described above. After the completion of the addition, the mixture was stirred with ice-cooling under nitrogen for about 2 hours and then refluxed and stirred for 2 hours. After the completion of the reaction, the reactor was ice-cooled and pyridine hydrochloride was removed by filtration. The filtrate was concentrated and the solid matter thus obtained was recrystallized from acetic anhydride to give 48 g of 3,5- (benzyl pelargonate)-dibenzamide-3,3',4,4'-tetracarboxylic acid dianhydride.

4.32 g (0.01 mol) of BAPS-M and 30 g of DMAc were introduced into a 300 ml separable flask provided with a stirrer. Then 6.3 g (0.01 mol) of the acid dianhydride of this Example was added at once thereto under vigorously stirring and stirring was continued as such for 30 minutes. 0.93 g (0.02 mol) of β-picoline, 5 g of acetic anhydride and 10 g of DMAc were added to the reaction solution and the resultant mixture was heated to about 120° C. for imidation. These reactions were carried out under a nitrogen gas stream. After the completion of the reaction, the reaction mixture was poured into methanol, filtered and dried to thereby give 9.8 g of a yellow polyimide powder. This polyimide powder had a weight-average molecular weight of 80,000. A film was formed as in Example 1 and the water absorption was measured. As a result, this film showed a water absorption of 1.2%.

EXAMPLE 8

3,5-(Benzyl octanesulfonate)-dibenzamide-3,3',4,4'-tetracarboxylic acid dianhydride was obtained as in Example 7 but using octanesulfonic acid chloride as a substitute for the pelargonic acid chloride.

4.32 g (0.01 mol) of BAPS-M and 30 g of DMAc were introduced into a 300 ml separable flask provided with a stirrer. Then 6.2 g (0.01 mol) of the acid dianhydride of this Example was added at once thereto under vigorously stirring and stirring was continued as such for 30 minutes. 0.93 g (0.02 mol) of β-picoline, 5 g of acetic anhydride and 10 g of DMAc were added to the reaction solution and the resultant mixture was heated to about 120° C. for imidation. These reactions were carried out under a nitrogen gas stream. After the completion of the reaction, the reaction mixture was poured into methanol, filtered and dried to thereby give 10 g of a yellow polyimide powder. This polyimide powder had a weight-average molecular weight of 80,000. A film was formed as in Example 1 and the water absorption was measured. As a result, this film showed a water absorption of 1.3%.

EXAMPLE 9

26.4 g (0.1 mol) of (3,5-diaminobenzoate)octane and 400 g of DMAC were introduced into a 2,000 ml separable flask provided with a stirrer. Then 48.4 g (0.1 mol) of 2,5-(benzenecarboxylic octane)-dibenzoate-3,3',4,4'-tetracarboxylic acid dianhydride synthesized in Example 1 was added at once thereto under vigorously stirring and stirring was continued as such for 30 minutes. 9.3 g (0.2 mol) of β-picoline, 50 g of acetic anhydride and 100 g of DMAc were added to the reaction solution and the resultant mixture was heated to about 120° C. for imidation. These reactions were carried out under a nitrogen gas stream. After the completion of the reaction, the reaction mixture was poured into methanol, filtered and dried to thereby give 69 g of a yellow polyimide powder. This polyimide powder had a weight-average molecular weight of 100,000. A film was formed as in Example 1 and the water absorption was measured. As a result, this film showed a water absorption of 0.2%.

COMPARATIVE EXAMPLE 1

43.2 g (0.1 mol) of BAPS-M and 160 g of DMAc were introduced into a 2,000 ml separable flask provided with a stirrer. Then 21.8 g (0.1 mol) of pyromellitic acid dianhydride was added at once thereto under vigorously stirring and stirring was continued as such for 30 minutes to give a polyamic acid solution. 100 g of this polyamic acid solution was mixed with 9.3 g (0.2 mol) of β-picoline, 20 g of acetic anhydride and 20 g of DMAc and the obtained mixture was cast on an aluminum foil. After drying at 100° C. for 2 minutes, the polyimide film was stripped from the aluminum foil and fixed in a pin frame. After drying at 200° C. for 2 minutes, at 300° C. for 2 minutes and at 400° C. for 2 minutes, a polyimide film of 25 μ in thickness was obtained. Since the polyimide was insoluble in solvents, it was impossible to measure the weight-average molecular weight thereof. This film showed a water absorption of 2.8%.

COMPARATIVE EXAMPLE 2

26.4 g (0.1 mol) of (3,5-diaminobenzoate)octane and 400 g of DMAc were introduced into a 2,000 ml separable flask provided with a stirrer. Then 21.8 g (0.1 mol) of pyromellitic acid dianhydride was added at once thereto under vigorously stirring and stirring was continued as such for 30 minutes to give a polyamic acid solution. 100 g of this polyamic acid solution was mixed with 9.3 g (0.2 mol) of β-picoline, 20 g of acetic anhydride and 20 g of DMAc and the obtained mixture was cast on an aluminum foil. After drying at 100° C. for 2 minutes, the polyimide film was stripped from the aluminum foil and fixed in a pin frame. After drying at 200° C. for 2 minutes and at 300° C. for 2 minutes, a polyimide film of 25 μm in thickness was obtained. Since the polyimide was insoluble in solvents, it was impossible to measure the weight-average molecular weight thereof. This film showed a water absorption of 2%.

The invention provides novel polyimides substituted by a substituent having an alkyl or fluoroalkyl group and having reduced water absorption. The invention further provides a process for producing these novel polyimides and novel acid dianhydrides to be used in the production thereof.

While the invention has been described in detail and with reference to specific examples thereof, it will be apparent to one skilled in the art that various changes and modifications can be made therein without departing from the spirit and scope thereof.

What is claimed is:

1. A polyimide containing a structure represented by the following general formula (I):

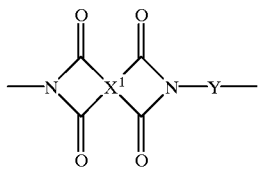

(I)

wherein $X^1$ represents a tetravalent organic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group); and Y represents a divalent organic group.

2. The polyimide as claimed in claim 1 wherein said A is an ester bond, an amide bond or a sulfonamide bond.

3. The polyimide as claimed in claim 1 which is a copolymer having a structure represented by the following general formula (II):

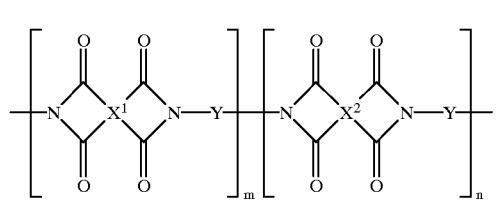

(II)

wherein $X^1$ represents a tetravalent organic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group);

$X^2$ is a tetravalent organic group different from $X^1$;

Y represents a divalent organic group;

m is an integer of 1 or more;

n is an integer of 0 or more; and m/m+n is 0.01 or more; and having an average molecular weight of from 5,000 to 1,000,000.

4. The polyimide as claimed in claim 1 wherein said $X^1$ is represented by the following general formula:

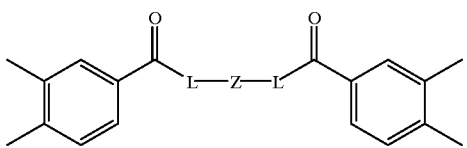

wherein Z represents a divalent aromatic or aliphatic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group); and L is —O— or —NH—.

5. The polyimide as claimed in claim 4 wherein said Z is represented by one of the following general formulae:

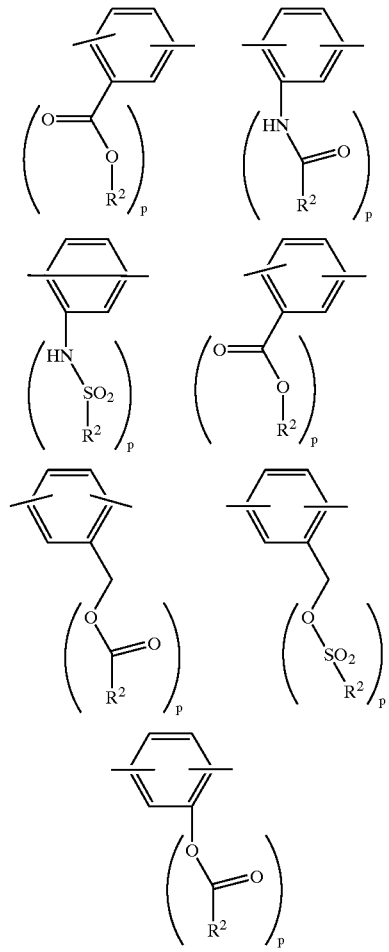

wherein $R^2$ represents a $C_{1-25}$ alkyl group or a fluoroalkyl group; and p is from 1 to 4.

6. The polyimide as claimed in claim 4 wherein said Z is —$CH_2CH(COOR^2)CH(COOR^2)CH_2$—, —$CH_2CH(OCOR^2)CH(OCOR^2)CH_2$—, —$CH_2C(CH_2COOR^2)_2CH_2$—, —$CH_2C(CH_2OCOR^2)_2CH_2$—, —$CH(CH_2COOR^2)CH(CH_2COOR^2)$—, —$CH(CH_2OCOR^2)CH(CH_2OCOR^2)$— or —$CH_2CH(CH_2COOR^2)$—, wherein $R^2$ represents a $C_{1-25}$ alkyl group or a fluoroalkyl group.

7. A composition containing a polyimide as claimed in any of claims 1 to 6.

8. A polyamic acid containing a structure represented by the following general formula (III):

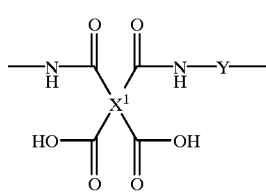

(III)

wherein $X^1$ represents a tetravalent organic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group); and Y represents a divalent organic group.

9. The polyamic acid as claimed in claim 8 wherein said A is an ester bond, an amide bond or a sulfonamide bond.

10. The polyamic acid as claimed in claim 8 which is a copolymer having a structure represented by the following general formula (IV) or a structure represented by the following general formula (IV) wherein some of the amic acid moiety has been dehydrated and condensed:

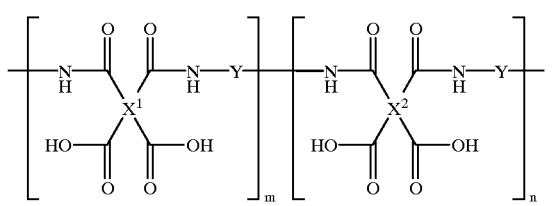

(IV)

wherein $X^1$ represents a tetravalent organic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group);

$X^2$ is a tetravalent organic group different from $X^1$;

Y represents a divalent organic group;

m is an integer of 1 or more;

n is an integer of 0 or more; and m/m+n is 0.01 or more; and having an average molecular weight of from 5,000 to 1,000,000.

11. The polyamic acid as claimed in claim 8 wherein said $X^1$ is represented by the following general formula:

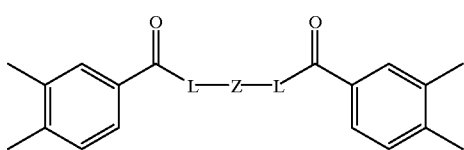

wherein Z represents a divalent aromatic or aliphatic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group); and L is —O— or —NH—.

12. The polyamic acid as claimed in claim 11 wherein said Z is represented by one of the following general formulae:

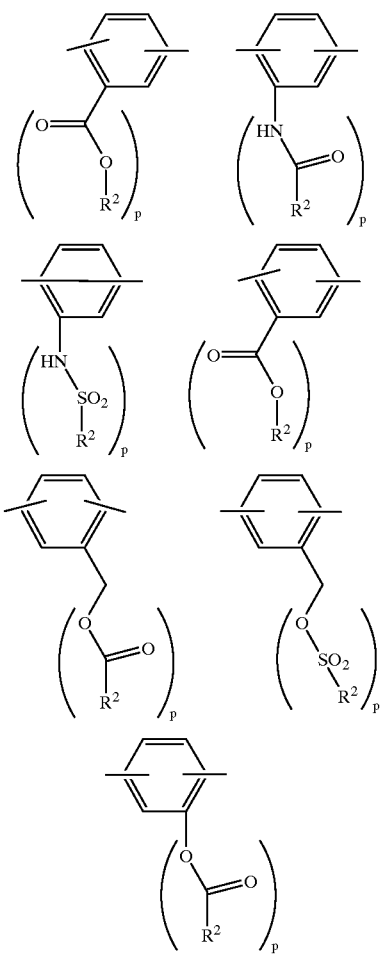

wherein $R^2$ represents a $C_{1-25}$ alkyl group or a fluoroalkyl group; and p is from 1 to 4.

13. The polyamic acid as claimed in claim 11 wherein said Z is —$CH_2CH(COOR^2)CH(COOR^2)CH_2$—, —$CH_2CH(OCOR^2)CH(OCOR^2)CH_2$—, —$CH_2C(CH_2COOR^2)_2CH_2$—, —$CH_2C(CH_2OCOR^2)_2CH_2$—, —$CH(CH_2COOR^2)CH(CH_2COOR^2)$—, —$CH(CH_2COOR^2)CH(CH_2OCOR^2)$— or —$CH_2CH(CH_2COOR^2)$—, wherein $R^2$ represents a $C_{1-25}$ alkyl group or a fluoroalkyl group.

14. A process for producing a polyimide involving the step of reacting an acid dianhydride with a diamine, wherein said polyimide contains a structure represented by the following general formula (I):

(I)

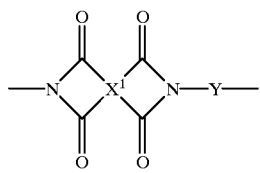

wherein $X^1$ represents a tetravalent organic group having a substituent —$R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group); and Y represents a divalent organic group.

15. A process for producing a polyamic acid involving the step of reacting an acid dianhydride with a diamine, wherein said polyamic acid contains a structure represented by the following general formula (III):

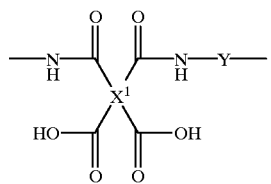

(III)

wherein $X^1$ represents a tetravalent organic group having a substituent $—R^1AR^2$ (wherein A represents a divalent linkage group; $R^1$ represents a single bond or a $C_{1-3}$ alkylene group; and $R^2$ represents a $C_{1-25}$ alkyl group or a fluoroalkyl group); and Y represents a divalent organic group.

* * * * *